United States Patent [19]
Freeny, Jr.

[11] Patent Number: 4,837,797
[45] Date of Patent: Jun. 6, 1989

[54] ELECTRONIC MESSAGE UNIT AND METHODS USING SAME

[75] Inventor: Charles C. Freeny, Jr., Fort Worth, Tex.

[73] Assignee: Advanced Service Development Corporation, Oklahoma City, Okla.

[21] Appl. No.: 148,100

[22] Filed: Jan. 27, 1988

Related U.S. Application Data

[63] Continuation of Ser. No. 802,666, Nov. 27, 1985, abandoned.

[51] Int. Cl.$^4$ ...................... H04M 1/64; H04M 11/00
[52] U.S. Cl. ........................................ 379/96; 379/67; 379/98; 379/217
[58] Field of Search ................... 379/107, 100, 98, 96, 379/213, 214, 88, 67, 82, 217, 57

[56] References Cited

U.S. PATENT DOCUMENTS

| | | | |
|---|---|---|---|
| 3,829,833 | 8/1974 | Freeny, Jr. | 340/825.31 |
| 3,911,397 | 10/1975 | Freeny, Jr. | 235/382 |
| 3,924,065 | 12/1975 | Freeny, Jr. | 375/47 |
| 3,946,220 | 3/1976 | Brobeck et al. | 364/405 |
| 3,970,992 | 7/1976 | Boothroyd et al. | 364/900 |
| 4,112,421 | 9/1978 | Freeny, Jr. | 342/457 |
| 4,209,787 | 6/1980 | Freeny, Jr. | 342/457 |
| 4,215,243 | 7/1980 | Maxwell | 379/98 X |
| 4,217,588 | 8/1980 | Freeny, Jr. | 342/458 |
| 4,220,991 | 9/1980 | Hamano et al. | 364/405 |
| 4,232,317 | 11/1980 | Freeny, Jr. | 342/464 |
| 4,265,371 | 5/1981 | Desai et al. | 222/639 |
| 4,270,182 | 5/1981 | Asija | 364/900 |
| 4,328,544 | 5/1982 | Baldwin et al. | 364/405 |
| 4,394,540 | 7/1983 | Willis et al. | 379/104 |
| 4,464,542 | 8/1984 | Baudoin et al. | 379/96 |
| 4,503,288 | 3/1985 | Kessler | 379/67 |
| 4,524,244 | 6/1985 | Faggin et al. | 379/93 |
| 4,527,013 | 7/1985 | Hardy | 379/214 |
| 4,528,643 | 7/1985 | Freeny, Jr. | 364/900 |

FOREIGN PATENT DOCUMENTS

0025466  2/1984  Japan ...................................... 379/98

Primary Examiner—Thomas W. Brown
Attorney, Agent, or Firm—Dunlap, Codding, Peterson & Lee

[57] ABSTRACT

An electronic message unit adapted for use with an existing telephone and a public communication link for receiving incoming messages (machine interpretable messages and voice messages) over the communication link and for receiving incoming call signals indicating an incoming message being receivble over the communication link including a telephone control assembly and a message controller. The telephone control assembly is connectable to the communication link and to the existing telephone for receiving call incoming signals and for connecting to the communication link in response to receiving a call incoming signal, the telephone control assembly receiving the incoming messages over the communication link when connected to the communication link and outputting the received incoming messages. The message controller receives the incoming messages outputted by the telephone control assembly and determines the incoming message to be either a machine interpretable message or a voice message. The message controller provides an output ring signal in response to determining a voice message being received over the communication link for causing audibly perceivable ring output indication indicating a voice message being received over the communication link, and the message controller outputs the incoming message in response to determining a machine interpretable message being received over the telephone link for reproduction in a retrievable form without causing the audibly perceivable ring output indication to be provided.

7 Claims, 5 Drawing Sheets

ELECTRONIC MESSAGE UNIT AND METHODS USING SAME

FIELD OF THE INVENTION

This application is a continuation of Ser. No. 802,666, filed Nov. 27, 1985, now abandoned, entitled Electronic Message Unit And Methods For Using Same.

1. Field of the Invention

The present invention relates generally to electronic units which are adapted to receive voice messages and machine interpretable messages (messages in a machine readable format) and, more particularly, but not by way of limitation, to an electronic message unit which is connectable to an existing telephone and to existing, public communication links for receiving voice messages and machine interpretable messages wherein the electronic message unit identifies and outputs received machine interpretable messages and wherein the electronic message unit outputs an output ring signal for causing an audibly perceivable ring output indication in response to receiving a voice message.

DESCRIPTION OF THE PREFERRED EMBODIMENTS

Figure 1:
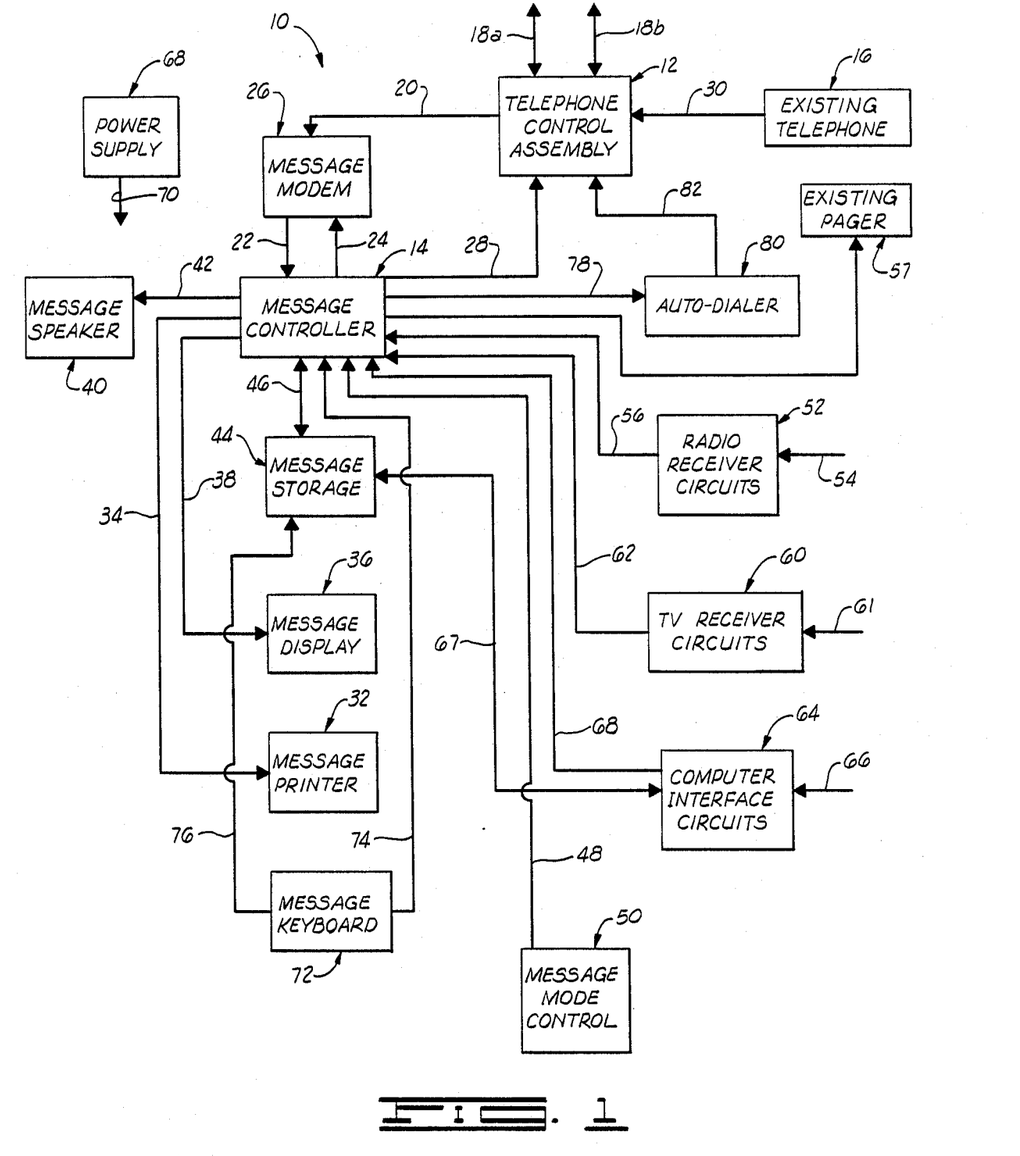
FIG. 1 is a schematic, diagrammatic view of an electronic message unit which is constructed in the accordance with the present invention.

Shown in FIG. 1 and designated by the general reference numeral 10 is an electronic message unit which is constructed in accordance with this present invention. The electronic message unit 10 basically includes a telephone control assembly 12 and a message controller 14. The electronic message unit 10 is adapted for use with an existing telephone 16 and is connectable to at least one existing, public telephone link 18 (two telephone links 18a and 18b being shown in FIG. 1 since, in one preferred embodiment to be described in greater detail below, the electronic message unit 10 is connectable to at least two telephone links 18). The electronic message unit 10 thus is interposed between the telephone links 18a and 18b and the existing telephone 16, and the electronic message unit 10 is adapted to receive incoming messages (machine interpretable messages and voice messages) over the telephone links 18a and-/or 18b and for receiving call incoming signals over the telephone links 18a and/or 18b indicating incoming messages are receivable over the telephone link 18a and/or 18b.

The telephone control assembly 12 is connectable to the telephone links 18 and to the existing telephone 16 and the telephone control assembly 12 is adapted to receive call incoming signals over the telephone links 18. In response to receiving a call incoming signal over one of the telephone links 18a or 18b, the telephone control assembly 12 provides an off hook signal for connecting or causing the telephone link 18a or 18b to be connected for receiving incoming messages. The telephone control assembly 16 receives incoming messages over the telephone link 18a or 18b when the respective telephone link 18a or 18b is properly connected, and the telephone control assembly 12 outputs the received incoming message over a signal path 20.

The message controller 14 is connected to a message modem 26 via signal paths 22 and 24, and the message controller 14 is programmed to operate the message modem 26 for receiving incoming messages. The incoming message on the signal path 20 is received by the message modem 26 and the message modem 26 outputs the incoming message over the signal path 22 for reception by the message controller 14. The message controller 14 receives the incoming message outputted by the telephone control assembly 12 and the message controller 14 is programed to determined if the incoming message is a machine interpretable message (a message in a machine readable format) or a voice message (voice message). More particularly, the message controller 14 determines if the incoming message is machine interpretable message and, if the incoming message is not a machine interpretable message, the message controller 14 is programmed to treat the incoming message as a voice message.

The message controller 14 outputs an output ring signal over a signal path 28 in response to determining the incoming message to be a voice message or, more particularly, in response to determining the incoming message is not a machine interpretable message, for causing an audibly perceivable ring output indication indicating a human interpretable message is being received over the telephone link 18a or 18b. The message controller 14 is programmed to output the incoming message in response to determining the incoming message to be a machine interpretable message for reproduction in a retrievable form without causing the audibly perceivable ring output indication. The message controller 14 is programmed to provide a disconnect signal outputted on the signal path 28 for reception by the telephone control assembly 12 after the message controller 14 has received the machine interpretable message, and the telephone control assembly 12 is adapted to disconnect the telephone link 18 in response to receiving the disconnect signal.

Existing telephones and the associated existing telephone circuits, such as the existing telephone 16 shown in FIG. 1, are well known in the art and existing telephone links, such as the telephone links 18, also are well known in the art. As presently existing, the telephone link normally is connected to the telephone circuits in the existing telephone. When an individual places a call (dials the telephone number associated with a particular other telephone), a call incoming signal is outputted over the telephone link which is received by the existing other telephone which causes the existing other telephone circuits to provide an audibly perceivable ring output indication (causes the telephone to ring) indicating an incoming call is on the telephone link. If the individual takes the receiver off the hook, an off hook signal is provided for causing the two telephones to be connected via the telephone link so the incoming voice message can be received (so the two individuals can communicate over the connected telephone link).

This foregoing description describes what may be referred to as a normal operation of existing telephones and telephone links.

The electronic message unit 10 of the present invention answers the incoming call signal by providing the off hook signal for connecting the telephone link 18a or 18b for receiving incoming messages. The electronic message unit 10 does not interfere with a normal operation of the telephone, as generally described before since, if the incoming message is determined to be a voice message, the audibly perceivable ring output indication is provided so the individual can answer the telephone and communicate in the normal manner. However, the electronic message unit 10 does provide a means for receiving machine interpretable messages without interfering with the normal telephone operation and without causing the audibly perceivable ring output indication or, in other words, without disturbing the peace of those near the existing telephone 16 while receiving the machine interpretable messages.

It should be noted that the electronic message unit 10, as presently contemplated, does answer each incoming call and, thus, a voice message will be answered even though no human is available to physically answer the telephone 16 called in response to the outputted ring output indication. In one embodiment, the telephone control assembly 12 includes means for providing the audibly perceivable output indication in response to receiving the output ring signal on the signal path 28. In this embodiment, the message controller 14 is programmed to provide a disconnect signal on the signal path 28 if the existing telephone 16 is not answered within a predetermined period of time and the telephone control assembly 12 is adapted to disconnect the telephone link 18 in response to receiving the disconnect signal.

The owner of the existing telephone 16 can make outgoing calls in the normal manner even though the electronic message unit 10 is interposed between the existing telephone 16 and the telephone links 18. Thus, when an individual removes the receiver from the hook of the existing telephone 16, the existing telephone 16 is connected to one of the telephone link 18a or 18b, thereby resulting in a dial tone at the existing telephone 16. The individual then dials the desired number and, if the call is answered at the other existing telephone identified by the dialed telephone number, the telephone control assembly 12 receives the outgoing messages (voice messages or machine interpretable messages) over a signal path 30 and outputs the outgoing message over the connected telephone link 18a or 18b.

In one embodiment as shown in FIG. 1, the electronic message unit 10 includes a message printer 32 which is adapted to receive machine interpretable messages and to output the received machine interpretable messages on a print medium or, in other words, to provide a printed output of the received machine interpretable message in a human perceivable format. There are numerous commercially available printers capable of operating in the manner just described with respect to the message printer 32 and the construction and operation of such commercially available printers as well known in the art. For example, one printer which is commercially available and which could be utilized with the electronic message unit 10 is available from EPSOM, Model No. RX-80. In one embodiment, the message controller 14 is programmed to output the received machine interpretable message on a signal path 34 which is received by the message printer 32. The message printer 32 receives the machine interpretable message on a signal path 34 and the message printer 32 prints the received machine interpretable message on a print medium in a human perceivable format.

The message controller 14 is programmed to to convert the computer language of the received machine interpretable message into a printer language, a machine readable language which is receivable by the message printer 32 for outputting the received machine interpretable message on a print medium. Thus, the machine interpretable message outputted by the message controller 14 on the signal path 34, more particularly, has been converted by the message controller 14 to printer language even though it sometime is referred to herein simply as the machine interpretable message.

In one embodiment as shown in FIG. 1, the electronic message unit 10 includes a message display 36 for receiving machine interpretable messages and for displaying the received machine interpretable messages in a display medium in a human perceivable format. Displays which are constructed and adapted to operate in the manner just described with respect to the message display 36 are commercially available and the construction and operation of such displays are well known in the art. For example, one message display which is capable of operating in the manner just described with respect to the message display 36 is available from Lear Siegler, Model No. ADM3A. In one embodiment, the message controller 14 is programmed to output the received machine interpretable message on a signal path 38 which is received by the message display 36. The message display 36 receives the machine interpretable message on the signal path 38 and the message display 36 displays the received machine interpretable message in a display medium in a human perceivable format.

As mentioned before, the message controller 14 is programmed to determine the specific computer language of the received machine interpretable message and to decode the computer language of the received machine interpretable message. In the mode of operation where the message controller 14 outputs the received machine interpretable message to the message display 36, the message controller 14 also is programmed to convert the computer language of the received machine interpretable message into a display language, a machine readable language which is receivable by the message display 36 for outputting the received machine interpretable message in a display medium. Thus, the machine interpretable message outputted by the message controller 14 on the signal path 38 to the message display 36, more particularly, has been converted by the message controller 14 to a display language even though it sometimes it is referred to herein simply as the machine interpretable message.

In one embodiment as shown in FIG. 1, the electronic message unit 10 includes a message speaker 40 and, in this embodiment, the electronic message unit 10 is adapted to receive machine interpretable messages which are voice messages in a machine readable format. The message controller 14, in this embodiment, is programmed to receive the voice message in a machine readable format and to convert the received voice message in a machine readable format to a voice message in an analog format. In this embodiment, the message controller 14 is programmed to output the received voice message in an analog format on a signal path 42 which is received by the message speaker 40. The message speaker 40 receives the voice message in an analog format outputted by the message controller 14 and the message speaker 40 outputs the received voice message in an audibly perceivable medium which may be a recording medium, a medium for airways transmissions such as radio transmission or a medium for airways transmission from the message speaker 40 per se. The message speaker 40 thus may comprise a recorder for recording the received voice message in an analog format on a recording medium such as tape in a tape recorder, for example, or the message speaker 40 may be a receiver which includes a speaker and the necessary associated electrical circuits for receiving the voice message in an analog format an outputting the message for audible reproduction via the speaker. Message speakers of the type just described with respect to the message speaker 40 are commercially available and the construction and the operation of such various message speakers are well known in the art.

In one embodiment as shown in FIG. 1, the electronic message unit 10 includes a message storage 44 which is a storage device adapted to receive and store machine interpretable messages in a storage medium which may be a memory electronic chip, video tape, hard disk or floppy disk or combinations thereof for example. In one embodiment, the message controller 14 is programmed to output the received machine interpretable messages on a signal path 46 which are received by the message storage 44. The message storage 44 receives the machine interpretable messages outputted by the message controller 14 and the message storage 44 stores the received machine interpretable message in a storage medium. In one embodiment, the message controller 14 is programmed to receive a stored message outputting signal on a signal path 48 from a message mode control 50 and, in response to receiving the storage message outputting signal on the signal path 48, the message controller 14 is programmed to communicate with the message storage 44 by the signal path 46 and to receive the stored machine interpretable message to the signal path 46. In response to receiving the machines interpretable message on the signal path 46 from the message storage 44, the message controller 14 is programmed to output the received machine interpretable message on one or more or all of the signal paths 34, 38, or 42 for reception by one or more or all of the message printer 32, the message display 36 or the message speaker 40.

The message mode control 50, in one embodiment, is adapted to output a store message signal on the signal path 48 and the message controller 14 is programmed to receive the store message signal from the message mode control 50. The message controller 14 is programmed to be conditioned in the store message mode of operation in response to receiving the store message signal from the message mode control 50. In the store message mode of operation, the message mode controller 14 is programmed to receive the machine interpretable messages and to output the received sender messages to the message storage 44 for storing the received machine interpretable messages in the storage medium. More particularly, the message mode control 50 is adapted to output one or more or all of a message display output code, a message printer output code or a message speaker output code in the store message signal. In response to receiving a store message signal including the message printer output code, the message controller 14 is programmed to be conditioned in the store message mode and, in this mode of operation, the message controller 14 is programmed to decode the received machine interpretable message and to convert the computer language of the received machine interpretable message to printer language and to output the received machine interpretable message in printer language to the message storage 44 for storage in the storage medium of the message storage 44. In response to receiving a store message signal outputted by the message mode control 50 including the message display output code, the message controller 14 is programmed to be conditioned in the store message mode and, in this mode of operation, the message controller 14 is programmed to decode the computer language of the received machine interpretable message and to convert the computer language of the received machine sender message to display language and the message controller 14 is programmed to output the received machine interpretable message in a display language to the message storage 44 for storage in the storage medium of the message storage 44. In response to receiving a store message signal including the message speaker output code, the message controller 14 is programmed to be conditioned in the store message mode of operation and, in this mode of operation, the message controller 14 is programmed to output the machine interpretable message without decoding or converting the received machine interpretable message to the message storage 44 for storage in the storage medium of the message storage 44. In an alternate embodiment, the message controller 14 can be programmed to decode the received machine interpretable message and convert the computer language of the received machine interpretable message to an analog or digital format and to output the received machine interpretable message in an analog or digital format to the message storage 44 for storage in the storage medium of the message storage 44 in response to receiving the store message signal including the message speaker output code.

In one embodiment, the message mode control 50 is adapted to output one or more or all of a message display output code, a message printer output code or a message speaker output code in the store message signal. In this last mentioned embodiment, the message controller 14 is programmed to provide the machine interpretable message on the output signal path 34 to be received by the message printer 32 in response to receiving a store message signal including the message printer output code from the message mode control 50 on the signal path 48, the message controller 14 is programmed to provide the machine interpretable message on the output signal path 38 for reception by the message display 36 in response to receiving a store message signal including a message display output code from the message mode control 50, and the message controller 14 is programmed to output the machine interpretable message on the signal path 42 for reception by the message speaker 40 in response to receiving a store message signal including the message speaker output code on the signal path 48 from the message mode control 50. In each of the instances just described, the message controller 14 first retrieves the machine interpretable message from the message storage 44 by the signal path 46 and the message controller 14 then outputs the machine interpretable message to the message printer 32 and/or the message display 36 and or the message speaker 40 in the manner described before with respect to the operation of the message printer 32, the message display 36 and the message speaker 40.

More particularly, when the received machine interpretable messages have been stored in the message storage 44 by the message controller 14 in response to receiving a store message signal including the message printer output code, the machine interpretable message outputted by the message controller 14 on the signal path 34 for reception by the message printer 32 is the machine interpretable message in a printer language. Also, when the received machine interpretable messages have been stored by the message controller 14 in response to receiving a store message signal including the message display output code, the machine interpretable message outputted by the message controller 14 on the signal path 38 for reception by the message display 36 is the machine interpretable message in a display language. When the received machine interpretable message has been stored in the message storage 44 in response to receiving a store message signal including a message speaker output code and when the message controller 14 is programmed to store the received machine interpretable message in the computer language of the received machine interpretable message, the message controller 14 retrieves the stored machine interpretable message from the message storage 44, decodes the computer language of the machine interpretable message and converts the machine interpretable message into an analog or digital format for outputting the machine interpretable message on the signal path 42 in an analog or digital format for reception by the message speaker 40. As mentioned before, the message controller 14 can be programmed to decode the computer language of the received machine interpretable message and convert the computer language of the machine interpretable message to an analog or digital format and the message controller 14 can then be programmed to output the machine interpretable message in the analog or digital format for storage in the message storage 44. In this last mentioned mode of operation, and in response to receiving in a store message signal including the message speaker output code, the message controller 14 retreives the stored machine interpretable message from the message storage 44 and outputs the stored machine interpretable message on the signal path 42 for reception by the message speaker 40 without decoding and converting the machine interpretable message since the decoding and converting of the message interpretable message was accomplished by the message controller 14 prior to storing machine interpretable message in the message storage 44.

In one embodiment, the message mode control is positionable for providing the store message signal including one or more or all three of the message display output code, the message speaker output code and the message printer output code. In response to receiving the store message signal including one or more or all three of message display output code, the message speaker output code and, the message printer output code, the message controller 14 is programmed to output the received machine interpretable message for storage in the message storage 44 in the manners mentioned before with respect to the operation of the message controller 14 in response to receiving store message signals from the message mode control 40 including the message display output code or the message speaker output code or the message printer output code. In this embodiment, the message mode control also is positionable for outputting the store message signal including one or more or all three of the message display output code, the message speaker output code and the message printer output code. In this last mentioned embodiment, the message controller 14 is programmed to retrieve the stored machine interpretable message from the message storage 44 and to output the machine interpretable message in the manners mentioned before with respect to the operation of the message controller 14 in response to receiving store message signals including the message display output code or the message speaker output code or the message printer output code.

In one embodiment, the present invention contemplates a plurality of electronic message units 10 and each electronic message unit 10 is uniquely identified by a message unit code. In this embodiment, the message mode control 50 is adapted to provide an output private mode signal or an output public mode signal on the signal path 48 for reception by the message controller 14. The message controller 14 is programmed to receive the private mode signal and the public mode signal from the message mode control 50. The message controller 14 is conditionable in a private mode in response to receiving a private mode signal from the message mode control 50 and the message controller 14 is conditionable in a public mode in response to receiving a public mode signal from the message mode control 50. When the message controller 14 is conditioned in the public mode in response to receiving the public mode signal from the message mode control 50, the message controller 14 receives all machine interpretable messages and human interpretable messages, and the message controller 14 processes all received human interpretable messages and machine interpretable messages in the manners described before. When the message controller 14 is conditioned in the private mode in response to receiving a private mode signal from the message mode control 50, the message controller 14 is conditioned to receive all voice messages and to process all voice messages in the manners described before; however, the message controller 14 is programmed to receive all machine interpretable messages and to first determine if the received machine interpretable message includes the message unit code corresponding to the message unit code uniquely identifying the particular electronic message unit 10 receiving the machine interpretable message. The message controller 14 outputs the received machine interpretable message in the manners described before in response to determining the presence of the message unit code in the received machine interpretable message and the message controller 14 outputs a disconnect signal on the signal path 28 in response to determining a received machine sender code does not include a message unit code uniquely identifying the particular electronic message unit 10 receiving the machine interpretable message. In this embodiment, the telephone control assembly 12 is constructed and adapted to receive the disconnect signal on the signal path 28 outputted via the message controller 14 and the telephone control assembly 12 disconnects the telephone link 18a or 18b in response to receiving the disconnect signal from the message controller 14. In this manner and in the private mode of operation, each electronic unit 10 operates to eliminate and not receive and process undesired incoming messages, or in other words, the individual who sends the machine sender message must be authorized by the owner of the electronic message unit 10 in the sense that the interpretable of the machine sender message must have the message unit code or the machine interpretable message will not be received and processed by the particular electronic message unit 10 since the message unit code must be included in the machine interpretable message for the electronic message unit 10 to receive and process the incoming machine interpretable message in the private mode of operation.

In one other embodiment, the message controller 14 can be programmed to include one or a plurality of personal identification codes with each personal identification code uniquely identifying one or a class of senders of machine interpretable messages. In this form, the message mode control 50 also is adapted to provide an output personal mode signal on the signal path 48 for reception by the message controller 14 and the message controller 14 is programmed to be conditioned in the personal mode of operation in response to receiving the personal mode signal from the message mode control 50. In the personal mode of operation of the message controller 14, the message controller 14 receives all incoming machine interpretable messages and the message controller 14 first determines whether or not the received machine interpretable message includes one of the personal identification codes programmed into the message controller 14. If the received machine interpretable message does not include one of the personal identification codes programmed into the message controller 14, the message controller 14 is programmed to output a disconnect signal on the signal path 28 to the telephone control assembly 12 and the telephone control assembly 12 is adapted to disconnect the telephone link in response to receiving the disconnect signal on the signal path 28 from the message controller 14. If the message controller 14 determines that the received machine interpretable message includes one of the personal identification codes, the message controller 14 is programmed to output the received machine interpretable message in the manners described before. In this manner, various individuals or groups of individuals having different personal identification codes can download messages through the electronic message unit 10 only if the owner of the electronic message unit 10 desires to receive such a machine interpretable message by programming the particular personal identification codes into the message controller 14 and conditioning the message controller 14 in the personal mode of operation.

The telephone links 18 constitute existing public telephone wires in the case of landbased telephones or RF communication existing public telephone links in the case of mobile telephones which presently are connected from existing telephone companies to customers' homes or mobile telephone locations and these telephone links 18 typically are connected directly to the existing telephones under normal circumstances either by way of a hardwire connection or by way of a combination of hardwire and an RF connection in those instances where the landbased telephone is remote from the hardwire connection, such connections being shown by way of the signal path 30 in FIG. 1. The RF links are identified below by the reference numeral 19 when specifically referring to an RF link. It is important to note that the telephone links 18 are existing public telephone links normally utilized for transmitting human interpretable messages and machine interpretable messages and that these are existing public telephone links, as opposed to being a dedicated line type of communication link.

In one embodiment, the electronic message unit also includes radio receiver circuits 52 which are constructed to receive machine interpretable messages and voice messages over an RF communication link 54, as shown in FIG. 1. In this embodiment, the electronic message unit 10 is operable with an existing pager 57, as shown in FIG. 1. Pagers are commercially available and one such pager which is suitable for operation with the electronic message unit 10 is available from Motorola, Model No. MDP-1000, for example. Each pager, such as the existing pager 57, is uniquely identified by a pager code and the electronic message unit 10 is interposed between the existing pager 57 and the RF communication link 54.

The radio receiver circuits 52 receive all incoming messages over the RF communication link 54. If the received incoming message does not include the pager code uniquely identifying the existing pager 57, the radio receiver circuits 52 do not output the incoming message received over the RF communication link 54. If the incoming message includes the pager code uniquely identifying the existing pager 57, the radio receiver circuits 52 output the incoming message received over the RF communication link 52 on a signal path 56 for reception by the message controller 14.

The message controller 14 is programmed to determine if the message received from the radio circuits 52 is a machine interpretable message. In response to determining the received message to be a machine interpretable message, the message controller 14 is programmed to output the received machine interpretable message to one or more or all of the message printer 32, the message display 36, the message storage 44 and the message speaker 40 depending on the mode of operation as determined by the message mode control 50 in the manner described before.

If the message controller 14 determines the message received from the radio receiver circuits 12 is not a machine interpretable message (the voice message more particularly in this embodiment being referred to as a pager message), the message controller 14 outputs a beeper signal on a signal path 58 for reception by the existing pager 57. In response to receiving the beeper signal, the existing pager 57 functions in the normal or usual manner to provide a human perceivable output indication indicating the reception of a pager message.

The radio receiver circuits 52 are of the type of circuits normally associated with existing pagers, such as the commercially existing pager mentioned before. Utilizing the electronic message unit 10 with existing pagers, individuals can be paged in the normal manner over existing pager networks and the existing pager networks also can be utilized to communicate machine interpretable messages to the owners of the existing pagers without interferring with the normal operation of the pager.

The electronic message unit 10 also includes TV receiver circuits 60 which are constructed and adapted to receive incoming messages (machine interpretable message only) over a television communication link 61 (cable or transmitted). The TV receiver circuits 60 output the received machine interpretable message on a signal path 62 for reception by the message controller 14. In this mode of operation, the message controller 14 receives the incoming machine interpretable message on the signal path 62 and the message controller 14 operates in the manners described before to output the incoming machine interpretable message on one or more or all of the signal paths 34, 38, 42 and 46 to the respective message printer 32, message display 36, message speaker 40 and/or message storage 44.

TV receiver circuits constructed and adapted to receive television machine interpretable messages over a cable television communication link in the manner described before with respect to the TV circuits 60 are commercially available and a detailed description of the construction and operation of such TV receiver circuits are not deemed necessary herein.

The electronic message unit 10 also includes computer interface circuits 64 which are connectable to an existing computer (not shown) by way of a communication link or signal path 66, and the computer interface circuits 64 are connected to the message controller 14 via a signal path 68, the computer interface circuits 64 also being connected to the message storage 44 via a signal path 67. The computer interface circuits 64 permit the electronic message unit 10 to be utilized with an individual's existing computer which is connected to the signal path 66, as a modem and/or storage without the necessity of the individual purchasing an additional modem. In this mode of operation, the individual connects the existing computer to the computer interface circuits 64 and the existing computer can communicate with other computers over the telephone links 18 via the message controller 14, the message modem 26 and the telephone control assembly 12. Further, machine interpretable messages can be outputted into the message storage 44 via the signal path 67 and/or machine interpretable messages can be received from the message storage 44 over the signal path 67.

Computer interface circuits constructed and adapted to receive and send messages over a communication link in the manner before described with the respect to the computer interface circuits 64 and the communication link 66 are well known in the art and a detail description of the construction and operation of such computer interface circuits are not deemed necessary herein.

With respect to messages received through the radio receiver circuits 52, the TV receiver circuits 60 and the computer interface circuits 64, the message controller 14 can be conditioned to operate in the public mode, the private mode or the personal mode in the manner described before with respect to the incoming messages received over the telephone links 18.

The electronic message unit 10 also includes a power supply 68 which is constructed and adapted to provide an output operating power supply signal on a signal path 70 for operating the various electronic components in the electronic message unit 10. Thus, the operating power supply signal on the signal path 70 is connected to the telephone control assembly 12, the message controller 14, the message modem 26, the message printer 32, the message display 36, the message speaker 40, the message storage 44, the message mode control 50, the radio receiver circuits 52, the TV receiver circuits 60 and the computer interface circuits 64 to provide operating electrical power to each of these assemblies. The telephone control assembly 12 is constructed and adapted to sense the outputting of the operating power supply signal and for connecting the existing telephone 16 directly to the telephone links 18a and 18b thereby bypassing the electronic message unit 10 in response to sensing a loss of the outputted operating power supply signal.

The electronic message unit 10 also includes a message keyboard 72 which is constructed and adapted to receive messages inputted by a human operator and to output those messages as machine interpretable messages (to output the messages in a machine readable form). The message keyboard 72 receives the operator inputted message and outputs the received inputted message as a machine interpretable message on a signal path 74 which is received by the message controller 14. The message controller 14 is programmed to receive the machine interpretable message received on the signal path 74. When the operator inputs the desired machine interpretable message by way of the keyboard 72, the operator also includes a store command or an auto-dial command so the machine interpretable message outputted on the signal path 74 by the message keyboard 72 also includes one of a store command or an auto-dial command.

The message controller 14 is programmed and adapted to receive the machine interpretable message outputted by the message keyboard 72 on the signal path 74 and, in response to determining a store command encoded in the machine interpretable message received from the message keyboard 72, the message controller 14 is programmed to output the machine interpretable message on the signal path 46 to the message storage 44 thereby storing the received machine interpretable message in the message storage 44. The keyboard 72 also is programmed and adapted to output the machine interpretable message on a signal path 76 which is connected to the message storage 44 and the message storage 44 is constructed and adapted to receive the machine interpretable message on the signal path 76 and to store the machine interpretable message received from the message keyboard 72 on the signal path 76. In this mode of operation, the message keyboard 72 is utilized to directly store the machine interpretable message in the message storage 44 of the electronic message unit 10.

In one other form of operation, the operator can input into the message keyboard 72 an audio-dial command and the auto-dial command would be included or encoded in the machine interpretable message outputted on either the signal path 76 for storage in the message storage 44 or outputted on the signal path 74 for receipt by the message controller 14. In this mode of operation, the message controller 14 is programmed to receive the machine interpretable message with the encoded auto-dial command and, in response to receiving the machine interpretable message encoded with the auto-dial command, the message controller 14 is programmed to output an auto-dial signal on a signal path 78. The auto-dial signal includes an auto-dial command and a telephone number to be automatically dialed. The auto-dial signal on the signal path 78 is received by an auto-dialer (automatic dialer) and the auto-dialer 80 is constructed and adapted to provide an output signal on a signal path 82 to the telephone control assembly 12 automatically dialing the predetermined telephone number encoded in the auto-dial signal in response to receiving the auto-dial signal along with the encoded auto-dial command. The telephone control assembly 12 is adapted to receive the auto-dial signal and to connect to one of the telephone links 18a or 18b thereby permitting the telephone number included in the signal outputted by the auto-dialer 80 to be dialed over the connected telephone link 18a or 18b. When the dialed telephone is answered, the message controller 14 outputs the machine interpretable message over the signal path 28 to the telephone control assembly 12 which outputs the received machine interpretable message over the connected telephone links.

The message controller 14 is adapted convert the machine interpretable message language into printer language (a machine readable format which can be received by the message printer 32 and outputted by the message printer 32) in store the machine interpretable message and printer language in the message storage 44. The message controller 14 is programmed to continually monitor the machine interpretable messages stored in the message storage 44 and, when a predetermined amount of machine interpretable messages have been stored in the message storage 44 approaching the storage limits of the message storage 44, the message controller 14 is programmed to provide an output indication indicating that a storage overflow condition is being approached with respect to the storage capacity of the message storage 44. In converting the machine interpretable message to a machine printer message in printer language, the message controller 14 is programmed to output the machine interpretable message in printer language which includes the priority and type print to be outputted by the message printer 32 or, in other words, the font, lines per inch and other such information.

The operating power supply signal outputted by the power supply 68 also is connected to the auto dealer 80.

Figure 2:
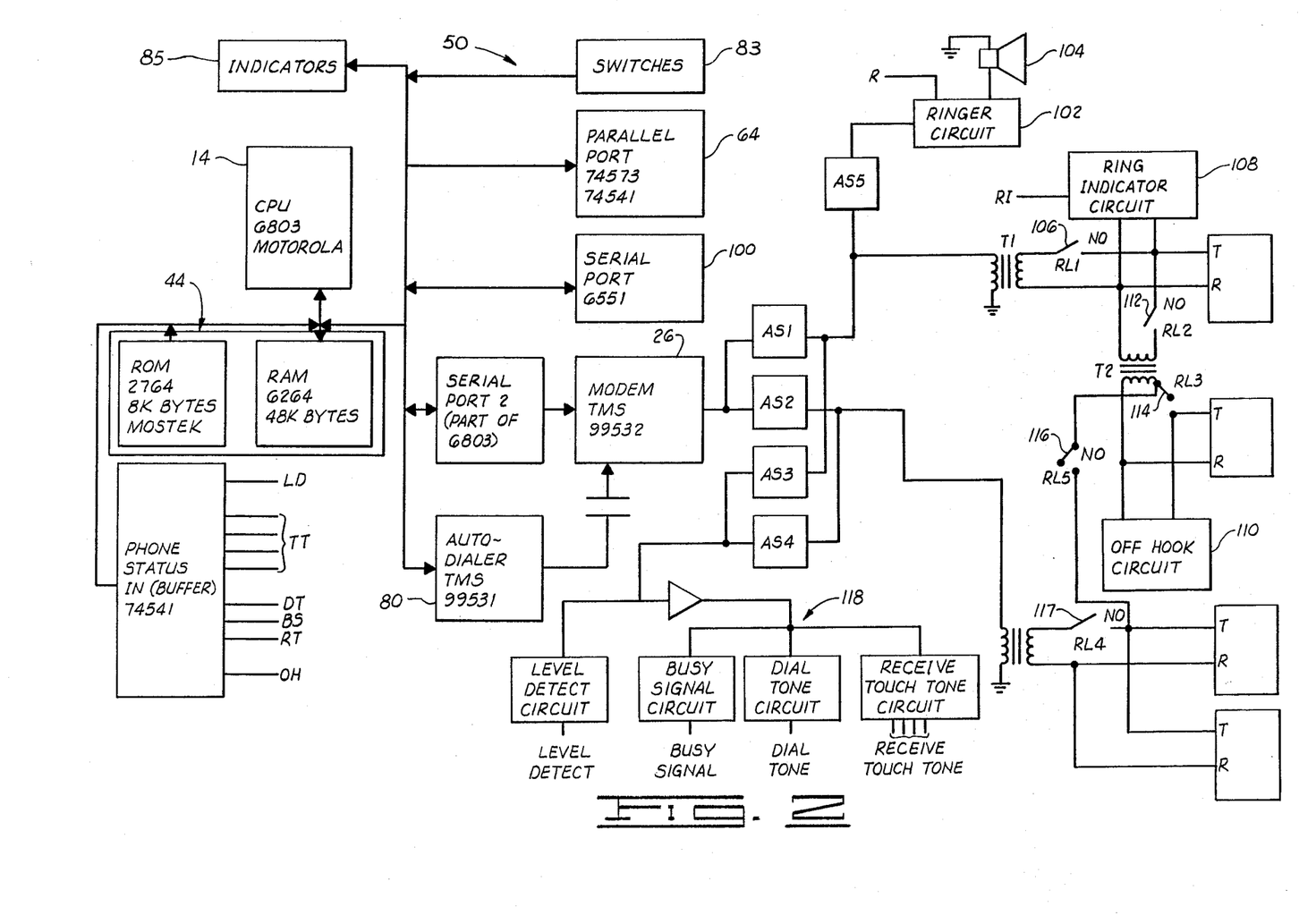
FIG. 2 is a schematic view showing a portion of the electronic message unit shown in FIG. 1 in greater detail.

EMBODIMENT OF FIG. 2

Shown in FIG. 2 is a more detailed version of one embodiment of the electronic message unit 10. As shown in this embodiment, the message mode control 50 constitutes a plurality of switches 83 for connecting the difference signals to the message controller 14 for placing or conditioning the message controller 14 in the various modes of operations or conditions described before, and, as shown in FIG. 2, the message mode control 50 also includes indicators 85 to provide human perceivable output indications indicating the mode of operation in which the message controller 14 has been switched.

In the embodiment shown in FIG. 2, the serial port 100 is adapted to be connected to the message printer 32 (shown in FIG. 1).

In the specific embodiment of the invention shown in FIG. 2, this electronic message unit 10 does not include the radio receiver circuits 52 or the TV receiver circuits 60 or the computer interface circuits 64, as shown in FIG. 1.

In response to receiving an incoming call signal on the telephone link 18a, a ring initiation circuit 108 is activated and, in response to the activation of the ring indicator circuit 108, a switch 106 is closed thereby connecting the telephone link 18a to the message controller 14 via the message modem 26. The ring initiation circuit 108 also causes an off hook signal to be outputted over the telephone link 18a for connecting the electronic message unit 10 to the telephone link 18a for receiving incoming messages (the ring initiation circuit 108 answers the incoming call and provides the proper off hook signal as the telephone company connects the telephone link 18a to the electronic message unit 10 for receiving incoming messages). If the message controller 14 determines the incoming message is not a machine interpretable message or, in other words, is a human interpretable message, the ring signal is outputted by the message controller 14 to a ringer circuit 102 which results in the audibly perceivable ring output indication to be provided by a speaker 104, the speaker 104 being connected to the ringer circuit 102.

In this embodiment, the ringer circuit and speaker in the existing telephone 16 are not utilized to provide the audibly perceivable ring output indication. Rather, the audibly perceivable ring output indication is provided by the separate ringer circuit 102 and speaker 104. When the individual removes the receiver from the existing telephone 16, an off hook circuit 110 is activated resulting in the closing of relays 112 and 114 thereby connecting the existing telephone 16 to the telephone link 18a and permitting two-way communication in the normal manner. The message controller 14 ceases providing the ring signal in response to the activation of the off hook circuit 110 or in one embodiment, after a predetermined lapse of time if not answered.

If the message controller 14 determines the incoming message to be a machine interpretable message, the message controller 14 causes the switches 112 and 114 to remain in the open position, thereby maintaining the telephone link 18a disconnected from the existing telephone 16 while the message controller 14 receives the incoming machine interpretable message. As mentioned before, the message controller 14 does not provide the ring signal in response to determining the incoming message to be a machine interpretable message.

When the telephone link 18a is being used for receiving machine interpretable messages, for example, the owner of the existing telephone 16 still can use the telephone link 18b in the normal manner. When the individual removes the receiver, the existing telephone provides the off hook signal and the individual's existing telephone 16 is connected to the telephone link 18b.

When receiving an incoming message over the telephone link 18a, the ring initiation circuit 108 also causes the relay 112 and 116 to be closed in addition to the relay 106, so the ring initiating circuit 108 is connected to the second telephone link 18b for operation in a manner like that described before with respect to the telephone link 18a. When an incoming message is received over the second telephone link 18b, the ring initiation circuit 108 caused the relay 117 to be closed and the off hook signal to be provided over the telephone link 18b for connecting the telephone link 18b to receive incoming messages (answers the incoming call). The electronic message unit 10 then receives and processes incoming messages over the telephone link 18b in a manner like that described before with respect to incoming messages received over the telephone link 18a.

In the embodiment of the invention shown in FIG. 2, the electronic message unit 10 also includes self test circuits 118 which operate with the message controller 14 to automatically test various aspects as indicated in the drawing of the operation of the electronic message unit 10 for quality control purposes. The self test circuits 118 include the switches designated AS1, AS2, AS3, AS4, and AS5 in the drawing for disconnecting the electronic message unit 10 from the existing telephone 16 in the event of a detected malfunction.

The outputs of the self test circuits 118 are also are provided to the message controller 14 and the message controller 14 is programmed to receive the self test circuits 118 output and to compare such outputs with predetermined operational parameters. The message controller 14 also can be programmed to receive the outputs from the self test circuits 118 and to store and update this information so the condition or status of the unit can be determined at any time, if desired.

With respect to the embodiment shown in FIG. 2, the following commercially available components have been found to be suitable:

|  | MANUFACTURER | MODEL NO. |
|---|---|---|
| CPU 14 | Motorola | MC6803 |
| ROM 44 | Mostek | 27C4 |
| RAM 44 | Hitachi | 6264(6) |
| PHONE STATUS IN BUFFER | Motorola | 74541 |
| PARALLEL PORT 64 | Motorola | |
| Buffer | | 74541 |
| Driver | | 74573 |
| SERIAL PORT 1 100 | Rockwell | 6551 |
| SERIAL PORT 2 | Motorola | Part of MC6803 |
| MODEM 26 | Texas Instruments | TMS 99532 |
| LEVEL DETECT CIRCUIT | Texas Instruments | TL072 |
| | Motorola | MC393 |
| DIAL TONE CIRCUIT | Motorola | 567 |
| RINGER CIRCUIT 102 | Motorola | 555 |
| | Motorola | MC1472 |
| RING INDICATOR CIRCUIT 108 | Texas Instrument | TIC155 |
| | Motorola | MC393 |
| OFF HOOK CIRCUIT 110 | Motorola | MC174IC |
| AS1 | Nippon Electric Co. | FR10324 |
| AS2 | Nippon Electric Co. | FR10324 |
| AS3 | Nippon Electric Co. | FR10324 |
| AS4 | Nippon Electric Co. | FR10324 |
| AS5 | Nippon Electric Co. | FR10324 |
| AUTO DIALER 80 | Texas Instruments | TMS 99531 |
| BUSY SIGNAL CIRCUIT | Motorola | 567 |
| RECEIVE TOUCH TONE CIRCUIT | Plessy Co. | MX 8860 |
| | Plessy Co. | MX 8865 |

Figure 3:
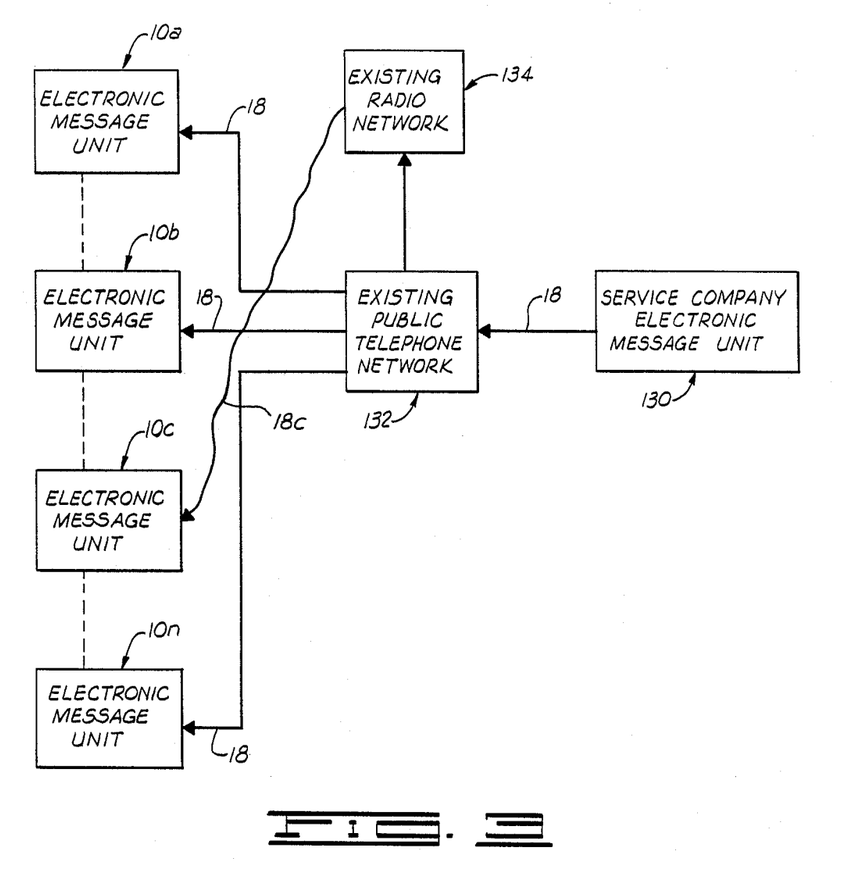
FIG. 3 is a schematic diagrammatic view showing the electronic message units of the present invention in a service company application.

EMBODIMENT OF FIG. 3

Shown in FIG. 3 is one system utilizing the electronic message units 10 of the present invention. This particular application is referred to generally as a service company type of application or system and, in this application, the service company has a service company electronic message unit 130 which is constructed exactly like the electronic message unit 10 shown in FIG. 1, except the service company electronic message unit 130 in this particular application does not necessarily need to include the message printer 32, the message display 36, the message speaker 40, the TV receiver circuits 60, the radio receiver circuits 52 or the computer interface circuits 64, although preferably the service company electronic message unit 130 does include the computer interface circuits 66 so existing computers can be utilized to download messages to the electronic message units 10 in addition to or in lieu of the keyboard 72.

In operation, the service company has a desire to download messages to various individuals using the various existing public telephone links 18 (three of the telephone links 18 shown in FIG. 3 as hardwired types of links and one of the telephone links 18c connected to the electronic message unit 10c being an RF communication telephone link). Each of the individuals or entities who are to receive messages from the service company has an electronic message unit. Shown in FIG. 3 are electronic messages unit 10a, 10b, 10c through 10n to indicate a plurality of electronic each of which may be located at the individual's or entity's home or place of business and connected to the individual's or entity's existing telephone in the manner described before. The electronic message units 10a, 10b and 10n are shown connected to the service company electronic message unit 130 via public telephone links 18 and 19 through an existing public telephone network 132 and the electronic message unit 10c is shown in FIG. 3 as being connected to the service company electronic message unit 130 through the existing public telephone network 132 and an existing radio network 134 by way of the RF communication telephone link 18c, the electronic message unit 10c in this example being connected to an existing mobile telephone and the electronic message units 10a, 10b and 10n being shown as connected to existing landbased telephones.

In this example, the service company enters the desired machine interpretable message by way of the keyboard 72 into the message controller 14 of the service company electronic message unit 130 and the service company also enters into the message controller 14 of the service company electronic message unit 130 the message unit code identifying the particular electronic message unit 10a, 10b, 10c or 10n to receive the particular entered machine interpretable message. In addition to the machine interpretable message entered into the message controller 14, the operator also can enter an auto-dial command or, in a preferred form, the message controller 14 and the message storage 44 are pre-programmed with the auto-dial command uniquely associated with each message unit code. The service company electronic message unit 130 message controller 14 then is programmed to automatically dial the telephone number associated with the entered message unit code using the automatic dialer 80, thereby connecting the service company electronic message unit 130 to the predetermined electronic message unit 10a, 10b, 10c or 10n uniquely identified by the entered message unit code, thereby connecting the service company electronic message unit 130 to the desired electronic message unit 10a, 10b, 10c or 10n by way of the proper telephone link 18. The service company electronic message unit 130 message controller 14 then automatically downloads the machine interpretable message over the desired telephone link 18 or 18c and the message is received by the electronic message unit 10a, 10b, 10c or 10n identified by the message unit code. The machine interpretable message received by the electronic message unit 10a, 10b, 10c or 10n is then outputted by the electronic message unit 10a, 10b, 10c, or 10n message controller 14 on the signal path 34 so the received machine interpretable message can be outputted by the message printer 32. As mentioned before, each of the electronic message units 10a, 10b, 10c and 10n also can be conditioned to output the received machine interpretable message to the message display 36, message storage 44 and/or the message speaker 40.

In one other form, the service company electronic message unit 130 message controller 14 can be programmed to download the machine interpretable message to all of the electronic message units 10a, 10b, 10c and 10n using the automatic dialer 80 and designating all of the message unit codes associated with the electronic message units 10a, 10b, 10c and 10n. In this last mentioned embodiment, the same machine interpretable message is downloaded to each of the electronic message units 10a, 10b, 10c and 10n and outputted by the message printer 32 associated with each of the electronic message units 10a, 10b, 10c and 10n. Again, in this embodiment as mentioned before the electronic message units 10a, 10b, 10c, and 10n each also can be conditioned to output the received machine interpretable message to the message display 36, message storage 44 and/or the message speaker 40.

One example of a service company application would be a property management company which is a company whose function it is to manage and maintain various properties. In this instance, the property management company (the service company) has various maintenance functions which must be performed with respect to the properties to be managed by the property management company such as plumber services, electrician services, lawn maintenance services, and various other repair services. In this property management company type of application, the electronic message units 10 are connected to an individual's or entity's existing telephone associated with the various services which from time to time may be desired by the property management company. When the property management company becomes aware of a particular service which needs to be performed with respect to a certain piece of property, the property management company enters the service to be performed along with the message unit code identifying the particular electronic message unit 10 associated with the company or individual to provide that particular service. The machine sender message then is downloaded automatically by the service company electronic message unit 130 to the particular electronic message unit 10 identified by the message unit code included in the machine interpretable message outputted by the service company electronic message unit 130. The outputted machine interpretable message then is received by the electronic message unit 10 identified by the message unit code and the electronic message unit 10 then functions to receive the machine interpretable message and to provide a print-out of the machine interpretable message by way of the message printer 32 associated with that particular electronic message unit 10.

Thus, the service company can collect all of the service functions to be performed by the service company and output all of the service requests to the particular individuals or entities to perform the services and those service requests are automatically provided on a print-out at the individual's or entity's telephone associated with the particular electronic message unit 10 by the message printer 32. The service requests can be collected during the day and outputted during the night so that the various service personal have a print-out each morning of the service requests which they are supposed to perform during that day and this has been accomplished without interferring with the normal operation of the individual's or entity's telephone and without causing the ring output indication at the individual's or entity's existing telephone. In addition, in this type of system, a particular individual or entity who might perform one of the designated services may have a landbase telephone and a mobile telephone and the service request can be outputted by the service company electronic unit 130 and printed at the individual's landbase telephone and/or at the individual's mobile telephone again without interferring with the normal operation of the individual's landbase telephone and/or mobile telephone. This may be particularly useful when a particular individual or entity who might perform one of the desired services has a mobile telephone in a service vehicle and the service company receives a service request during the day when the individual is not available at the mobile telephone or the landbase telephone, since the service request included in the machine interpretable message will be provided in a printed form at the individual's existing mobile telephone or existing landbase telephone by the message printer 32 regardless of whether or not the actual individual is present or near or otherwise able to answer an incoming telephone call.

One other service company type of application would be where the service company is a stock brokerage firm or a retail outlet firm or an insurance company or any other such company who has a desired to download information to its customers. In the past, these companies have downloaded information to customers using normal telephone communications or various forms of advertising such as television, advertising, radio advertising, newspaper advertising and direct mail advertising. These forms of downloading information to customers are costly and, in many instances, the information desired to be downloaded to the customers is not effectively communicated to the customer or, other words, the customer does not actually read the information downloaded in this prior manner. Utilizing the electronic message units 10, the service company can provide each of its customers with an electronic message unit 10 and the service company then can download information to each of its customers at night and without interferring with the customer's normal telephone usage or operation and without causing the telephone to ring. In this manner, each of the customers of the service company has a message from that service company printed at the customer's existing telephone.

In the service company application, the electronic message units 10 need not include a message display 36, a message keyboard 72, a message speaker 40, an autodialer 80, radio receiver circuits 52, TV receiver circuits 60 or the computer interface circuits 64, and the message controller 14 need not be programmed for operation with the existing paper 57. Although, it should be noted that one or more of all of these features just mentioned could be included if desired in a particular application.

Figure 4:
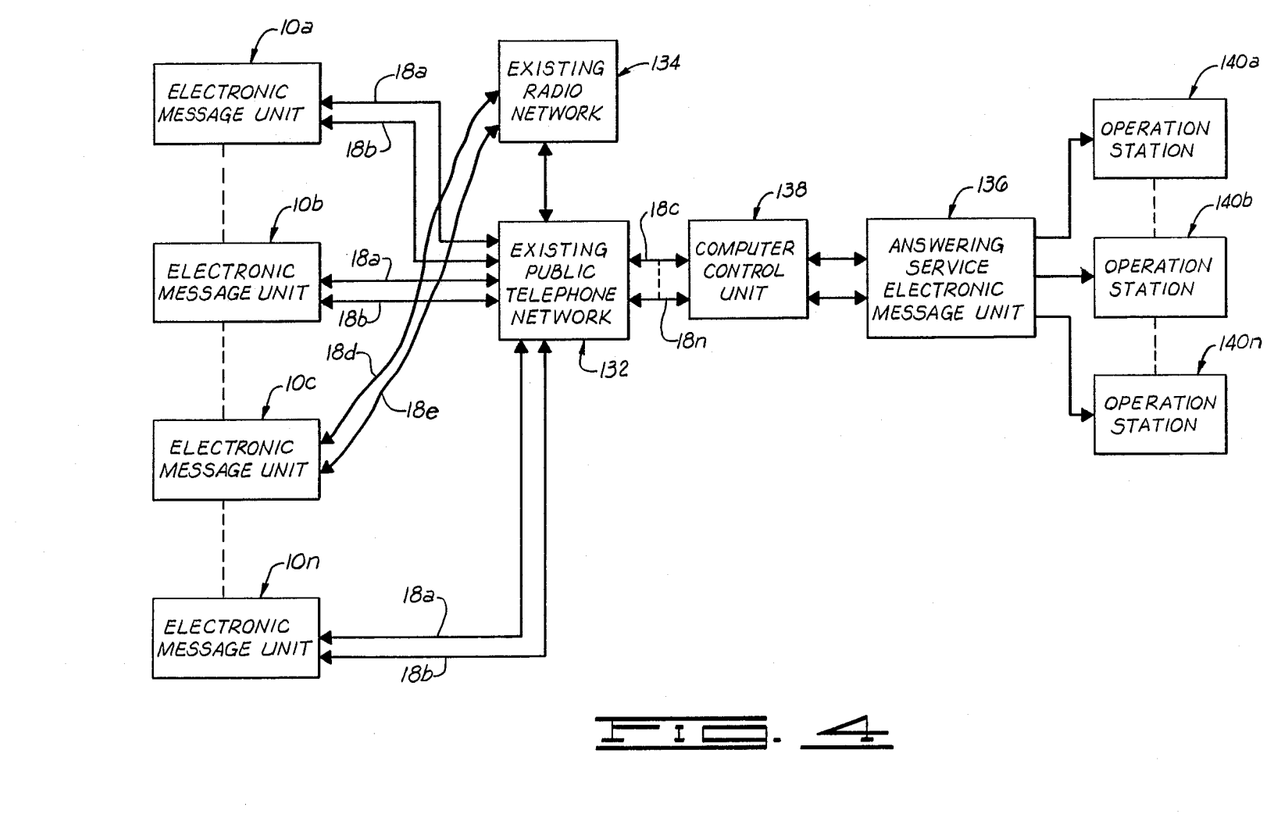
FIG. 4 is a schematic, diagrammatic view showing the electronic message units of the present invention in an answering service application.

EMBODIMENT OF FIG. 4

Shown in FIG. 4 is an answering service type of application utilizing the electronic message units 10.

In the past, answering services typically have been required to have one telephone link for each customer of the answering service and the customer has either had to subscribe to a call forwarding service through a existing public telephone network or the customer has had to purchase a diverter box which could be connected to the customer's telephone for diverting the incoming telephone call to the answering service in those areas where the call forwarding service was not available through the existing public telephone network. The fact that the answering service had to have one telephone line for each customer placed a physical imitation on the size of the answering service or, in other words, the number of customers of a particular answering service was limited by the number of telephone lines which could be connected to the answering service, a physical space limitation. In addition, each of the answering service customers in the past paid for the additional telephone line which was connected to the answering service and yet the answering service customer did not have the benefit of this additional telephone line or link. Further, in the past, the answering service customer typically would receive messages from the answering service by calling into the answering service and then the answering service operator had to read the various messages to the customer which has been time consuming and which has resulted in errors either on the answering service operator's part in providing the wrong message or on the customer's part in misinterpreting the message.

Utilizing the electronic message units 10, and as shown in FIG. 4, each of the answering service customers is provided with an electronic message unit, the electronic message units being shown in FIG. 4 and designated 10a, 10b, 10c and 10n to indicate a plurality of electronic message units 10. As shown in FIG. 4, the electronic message units 10a, 10b and 10n each are connected to two hardwired telephone links 18a and 18b for use in connection with existing land based telephones, and one of the answering service customers has a mobile telephone and the electronic message unit 10c is connected to the answering service customer's mobile telephone to receive and send messages by way of RF telephone links 18d and 18e.

Each of the answering service customers has two telephone links 18a or 18b or 18d and 18e in the embodiment of the invention and in the answering service application shown in FIG. 4. It is significant to note that each of the answering service customers thus has two telephone links 18a and 18b or 18d and 18e associated with each of the existing telephones of the answering services customer and it is significant to note that the answering service customer with the mobile phone 10c also has two radio telephone links 18d and 18e. Thus, each of the answering service customers has the use of two telephone links 18 and 18b or 18d and 18e in the embodiment of the invention shown in FIG. 4. As mentioned before, in the past, each answering service customer did pay for an additional telephone link; however, that additional telephone link was connected to the answering service and the answering service customer in the past did not have the use of this additional telephone link for which the answering service customer in fact was paying as part of the cost of the answering service. With the present invention as shown in FIG. 4, each of the answering service customers pays for the additional telephone link but also has the use of the additional telephone link.

At the answering service business, there is an answering service electronic message unit 136 which is constructed exactly like the electronic message unit 10 shown in FIG. 1, except the answering service electronic message unit 136 may or may not include the TV receiver circuits 60, the message speaker 40, the message printer 32 or the message display 36. Preferably, the answering service electronic message unit 136 does include the message display 36 and the message printer 32 so that the answering service has the use of these additional features.

The answering service electronic message unit 136 is connected to the existing public telephone network 132 by way of answering service telephone links 18c, the answering service telephone links being designated in FIG. 4 by the reference numerals 18c through 18n indicating a plurality of answering service telephone links. The answering service telephone links 18 are connected to a computer control unit 138 which is connected to the answering service electronic message unit 136 and the answering service electronic message unit 136 is connected to a plurality of operator stations 140, the operator stations 140 being designated in FIG. 4 as 140a, 140b through 140n to indicate a plurality of operator stations. Each operator station 140 is associated with an existing telephone and a particular operator at the answering service.

In the embodiment of the invention shown in FIG. 4, the telephone answering service does not need a telephone link for each of the answering service's customers. Rather, the answering service needs only a certain number of telephone links sufficient to handle the maximum number of incoming calls to the answering service at any given time which, in most instances, should be substantially less than the total number of customers of the answering service. The computer control unit 138 polls the answering service telephone links 18 to see if there are any incoming telephone calls on any of the answering service telephone links and, if there are incoming calls on any one of the answering service telephone links 18, the computer control unit 138 functions to output the incoming telephone call through the answering service electronic message unit 136 which is programmed to output the call to one of the available operator's stations 140.

In operation, the customer of the answering service would place the message mode control 50 in a position to output an answering service mode signal on the signal path 48 to the message controller 14. When an incoming voice message is received on one of the telephone links 18a or 18b or 18d or 18e, the message controller 14 in the particular electronic message unit 10 determines the incoming message to be a voice message and the message controller 14 outputs an audio-dial signal to the auto-dialer 80 and the auto-dialer 80 automatically dials the answering service telephone number. Assuming the incoming voice message was received on the telephone link 18a of the electronic message unit 10a, for example, the electronic message unit 10a would answer the incoming call and, after determinig the incoming call to be a voice message, the electronic message unit 10a would automatically dial the answering service telephone number over the second telephone link 18b. When the answering service answers that call from the electronic message unit 10a, the electronic message unit 10a automatically connects the telephone links 18a and 18b, thereby connecting the incoming voice message being received on the telephone link 18a to the answering service by way of the second telephone link 18b, allowing the answering service to answer the incoming voice message. The human sender message outgoing on the telephone link 18b from the electronic message unit 10a is received on one of the answering service's telephone links 18F through 18n and the computer control unit 138 connects that incoming voice message through the answering service electronic message unit 136 to one of the operator stations 140 and the operator at the operator's station 140 then answers and receives the voice message 140. After receiving the voice message by the operator at one of the operator's stations 140, the operator utilizing the answering service electronic message unit 136 inputs through the keyboard 72 of the answering service electronic message unit 136 a disconnect signal which is outputted by the answering service electronic message unit 136 over one of the answering service telephone links 18c through 18n and the telephone link 18b to the designated electronic message unit 10. The message controller 14 in the electronic message unit 10a receives the disconnect signal from the answering service over the telephone link 18b and the message controller 14 in the electronic unit 10a is programmed to output the disconnect signal on the signal path 28 to disconnect the telephone link 18a, thereby disconnecting the original incoming call over the telephone link 18a. However, the telephone link 18b still remains connected to the answering service by way of one of the answering service telephone links 18f through 18n. The operator at the operator station 140 who received the incoming voice message, then, in puts the received voice message into the message controller 14 of the answering service electronic message unit 136 utilizing the message keyboard 72 and the message controller 14 of the answering service electronic message unit 136 is programmed to output the received machine interpretable message for reception by the electronic message unit 10a over the telephone link 18b. This machine interpretable message received from the answering service by the electronic message unit 10a then is outputted on one or more or all of signal paths 34, 38 or 46 to be outputted by the message printer 32, the message display 36 and/or stored in the message storage 44 depending on the mode of operation of the electronic message unit 10a. Preferably, the message controller 14 in the answering service system shown in FIG. 4, is programmed to output the received machine interpretable message from the answering service on the signal path 34 so that a received machine interpretable message from the answering service is printed out by the message printer 32 at the electronic message unit 10a.

After the operator at the operator station 140 has outputted the received voice message as a machine interpretable message through the answering service electronic message unit 136, the operator at the operator station 40 then can disconnect the telephone links 18F through 18n and 18b thereby leaving both of the telephone links 18a and 18b at the customer's telephone operable to receive incoming messages.

In addition to outputting the received voice message as a machine interpretable message, the answering service electronic message unit 136 message controller 14 also can be programmed to output the machine interpretable message inputted by the operator via the message keyboard 72 of the answering service electronic message unit on the signal path 46 so that the machine interpretable message is stored in a retrievable manner at the answering service. This permits the answering service to have the information available so a customer still can call into the answering service and receive the information.

Figure 5:
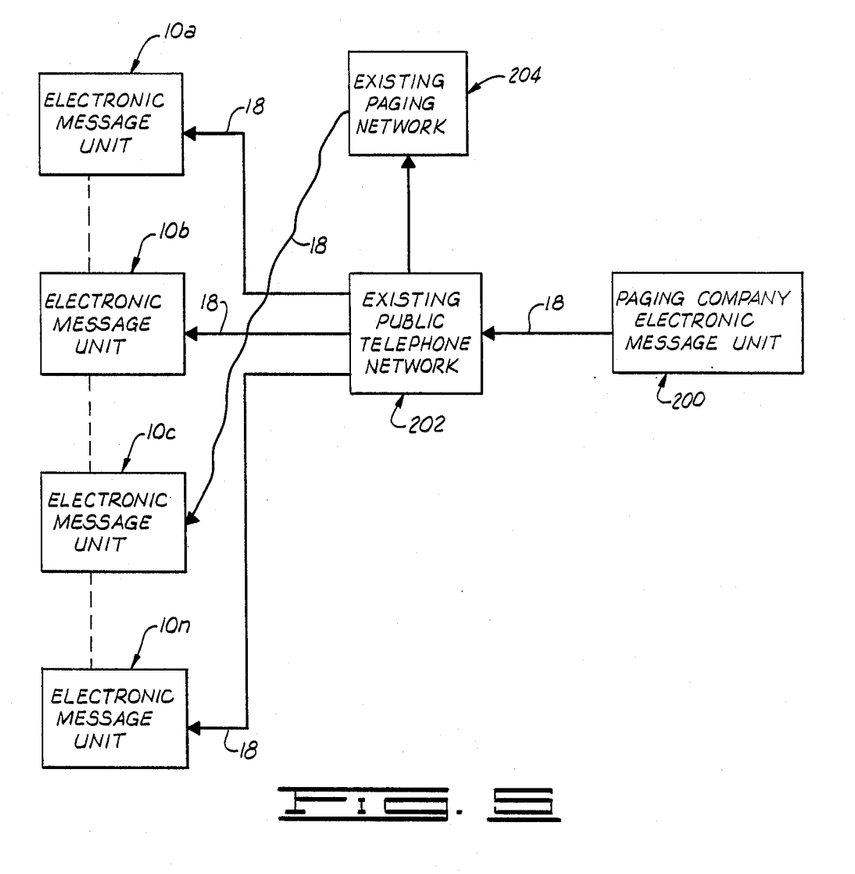
FIG. 5 is a schematic, diagrammatic view showing the electronic message units of the present invention in a paging company application.

EMBODIMENT OF FIG. 5

Shown in FIG. 5 is a paging company service type of application utilizing the electronic message units 10 of the present invention. As shown in FIG. 5, the customers of the paging company each have an electronic message unit 10 (a plurality of a electronic message units 10 being indicated in FIG. 5 by the numerals 10a, 10b, 10c through 10n). In this particular application, the electronic message units 10 can be constructed exactly like the electronic message unit 10 shown in FIG. 1; however, the automatic dialer 80, the TV receiver circuits 60, the computer interface circuits 64, the message keyboard 72, the message display 36 and the message speaker 40 can be eliminated and, of course, the electronic message unit is not connected to an existing telephoen 16 in this particular type of application. Rather each of the electronic message units 10 shown in FIG. 5 is connected to an existing pager 57.

In the paging company service application shown in FIG. 5, each electronic message unit 10 then has a message unit code (pager code) which uniquely identifies the particular electronic message unit 10 and the paging company can input normal paging calls through the message keyboard 72 and these paging messages each would include the message unit code (pager code) uniquely identifying the electronic message unit 10a associated with the existing pager 57 desired to be paged. The paging messages are outputted from a paging company electronic message unit 200 through the existing public telephone network 202 and through the existing paging network 204, the existing paging network 204 outputting the paging messages over the telephone links 18c (the telephone links 18c in this instance, being RF type telephone links since the paging messages normally are transmitted to the various pagers through RF communication links).

The radio receiver circuits 52 and each of the electronic message units 10 continuously receives messages transmitted over the telephone links 18 and 18c, when the radio receiver circuit 52 in a particular electronic message unit receives a message which includes the message unit code (pager code) uniquely identifying that particular electronic message unit 10 or, in other words, uniquely identifying the particular existing pager 57 associated with the particular electronic message unit 10, the radio receiver circuits 52 output the received message on the signal path 56 for reception by the message controller 14 in the electronic message unit 10.

The message controller 14 is programmed to determine if the message received on the signal path 56 from the radio receiver circuits 52 is a machine interpretable message and, in response to determining that the received message is not machine interpretable message, the message controller 14 determines the received message to be a pager message and the pager message is outputted by the message controller 14 on the signal path 58 for reception by the existing pager 57, the existing pager 57 providing the audibly perceivable output in response to receiving the pager message on the signal path 58 from the message controller 14. Thus, the paging company service type of system shown in FIG. 5 operate in a normal paging manner for sending pager messages paging messages) to the various existing papers as in the past.

Utilizing the electronic message units 10, each existing pager now also has the capability of receiving and outputting machine interpretable messages. In this mode of operation, the paging company inputs the desired message by way of the keyboard 72 and the keyboard 72 outputs the message as a machine interpretable message on the signal path 74 for reception by the message controller 14 of the paging company electronic message unit 200. The message controller 14 and the paging company electronic message unit 200 are programmed to output the received message which includes the message unit code (pager code) uniquely identifying the particular electronic message unit 10 desired to receive the machine interpretable message on the signal path 28. Thus, the machine interpretable messages outputted by the paging company electronic message unit 200 through the existing public telephone network 202 and the existing paging network 204 each includes a pager code and each machine sender message is received by the electronic message unit 10 identified by the pager code. The machine interpretable message are transmitted over the RF telephone links by the existing paging network 204.

For example, if the paging company desired to transmit a particular machine interpretable message to the electronic message unit 10a, the paging company would input the message into the paging company electronic message unit 200 along with the message unit code (pager code) uniquely identifying the electronic message unit 10a and the paging company electronic message unit 200 would output the machine interpretable message including the message unit code (pager code) for transmission by the existing paging network 204 to the various electronic message units 10. When the radio receiver circuits 52 in the electronic message unit 10a receive the machine interpretable message outputted by the paging company electronic message unit 200 including the message unit code (pager code) uniquely identifying the electronic message unit 10a, the radio receiver circuits 52 of the electronic message unit 10a output the received machine sender message over the signal path 56 for reception by the message controller 14 of the electronic message unit 10a. The message controller 14 is programmed to output the received machine interpretable message on the signal path 34 for reception by the message printer 32 and the electronic message unit 10a and the message printer 32 and the electronic message unit 10a outputs the received machine interpretable message in a human perceivable format.

Thus, utilizing the electronic message units 10 in the paging company service type of systems shown in FIG. 5, the paging company not only can send voice messages in the normal manner to the various existing pagers 57 but the paging company also has the ability to transmit machine interpretable messages to the various existing pagers 57 which can be provided in a printed format at the existing pager 57. Thus, the owner or user of an existing pager 57 now has the capability not only of receiving an indication that it is being paged, but also the existing pager has the capability of providing information relative to the page or other information in a printed format at the existing pager.

Changes may be made in the various elements or assemblies or components or in the steps or in the sequence of steps described herein without departing from the spirit and the scope of the invention as defined in the following claims.

- I claim:

1. An electronic message unit adapted for use with an existing telephone and an existing telephone link for receiving incoming messages (machine interpretable messages and voice messages) over the telephone link and for receiving call incoming signals indicating an incoming message (machine interpretable message or voice message) is receivable over the telephone link, comprising:

a telephone control assembly connectable to the telephone link and to the telephone for receiving call incoming signals and for connecting to the telephone link in response to receiving a call incoming signal, the telephone control assembly receiving the incoming messages over the telephone link when connected to the telephone link and outputting the received incoming message; and a message controller receiving the incoming messages outputted via the telephone control assembly, and for each incoming message determining if the incoming message is a machine interpretable message, the message controller providing an output ring signal in response to the incoming signal being a voice message for causing an audibly perceivable ring output indication indicating a voice message being received over the telephone link, and the message controller outputting the incoming message in response to determining a machine interpretable message being received over the telephone link for reproduction in a retrievable form without causing the audibly perceivable ring output indication to be provided;

wherein the electronic message unit is uniquely identified by a message unit code, and wherein at least some of the machine interpretable messages are defined further to include the message unit code, and wherein the message controller is defined further as being conditionable in one of a private mode and a public mode, the message controller outputting all received machine interpretable messages (machine interpretable messages including the message unit code and machine interpretable messages not including message unit code) in the public mode, and the message controller determining the presence of the message unit code in each of the received machine interpretable messages, and the message controller outputting the received machine interpretable message in response to determining the presence of the message unit code in the received machine interpretable message and the message controller outputting a disconnect signal in response to determining a received machine interpretable message not including a message unit code, and wherein the telephone control assembly is defined further as receiving the disconnect signal outputted via the message controller and disconnecting the telephone link in response to receiving the disconnect signal, and wherein the electronic message unit is defined further to include:

a mode control connected to the message controller being conditionable in one mode for providing a private mode signal and being conditionable in one other mode for providing a public mode signal; and wherein the message controller is defined further as receiving the private mode signal and the public mode signal from the mode control and the message controller being conditioned in the public mode in response to receiving the public mode signal and being conditioned in the private mode in response to receiving the private mode signal.

2. The electronic message unit of claim 1 wherein the telephone control assembly is defined further as receiving call outgoing signals from the telephone and connecting the telephone to the telephone link in response to receiving call outgoing signals for outputting the call outgoing signals over the telephone link, the telephone control assembly being adapted to receive outgoing messages (at least one of voice messages and machine interpretable messages) from the telephone and output the received outgoing messages over the telephone link.

3. The electronic message unit of claim 1 defined further to include:

a power supply for supplying an operating power signal; and means for sensing the outputting of operating power signal and for connecting the telephone to the telephone link thereby by-passing the electronic message unit in response to sensing a loss of the outputted operating power signal.

4. The electronic message unit of claim 1 wherein the telephone provides an off hook signal when conditioned to receive machine sender messages and send voice messages, and wherein the telephone control assembly is defined further as receiving the off hook signal and connecting the telephone to the telephone link in response to receiving the off hook signal.

5. The electronic message unit of claim 1 defined further to include:
a printer for receiving machine interpretable messages outputted by the message controller and for printing the machine interpretable messages on a print medium in a human perceivable format.

6. The electronic message unit of claim 1 defined further to include:
a message display for receiving machine interpretable messages outputted by the message controller and for displaying the machine interpretable messages in a display medium in a human perceivable format.

7. The electronic message unit of claim 1 wherein some of the machine interpretable messages include a personal identification code, and wherein the message controller is defined further as being conditionable in a personal mode, and the message controller determining the presence of the personal identification code in the received machine interpretable message, and the message controller outputting the received machine interpretable message, and the message controller outputting the disconnect signal in response to determining a received machine interpretable message not including the personal identification code, and wherein the mode control is defined further as being conditionable in one mode for providing a personal mode signal, and wherein the message controller is defined further as receiving the personal mode signal outputted by the mode control assembly and the message controller being conditionable in the personal mode signal outputted by the mode control assembly.

* * * * *